(12) United States Patent
Yoon et al.

(10) Patent No.: US 7,879,491 B2
(45) Date of Patent: Feb. 1, 2011

(54) ELECTRODE ASSEMBLY HAVING MEMBER FOR HOLDING ELECTRODES AND SECONDARY BATTERY COMPRISING THE SAME

(75) Inventors: Junill Yoon, Seoul (KR); Changjoo Han, Seoul (KR); Jongmoon Yoon, Daejeon (KR)

(73) Assignee: LG Chem, Ltd. (KR)

( * ) Notice: Subject to any disclaimer, the term of this patent is extended or adjusted under 35 U.S.C. 154(b) by 17 days.

(21) Appl. No.: 12/224,248

(22) PCT Filed: Jan. 18, 2007

(86) PCT No.: PCT/KR2007/000290
§ 371 (c)(1),
(2), (4) Date: Mar. 11, 2009

(87) PCT Pub. No.: WO2007/097524
PCT Pub. Date: Aug. 30, 2007

(65) Prior Publication Data
US 2009/0305133 A1 Dec. 10, 2009

(30) Foreign Application Priority Data
Feb. 23, 2006 (KR) ............... 10-2006-0017490

(51) Int. Cl.
*H01M 10/16* (2006.01)

(52) U.S. Cl. ............. 429/208; 429/100; 429/129; 429/138; 429/151; 429/154; 429/159; 429/161; 429/172; 429/239; 429/237; 429/186

(58) Field of Classification Search ........... 428/97, 428/99, 106, 122, 129, 138, 151, 154, 157, 428/159; 429/97, 99, 100, 122, 129, 138, 429/151, 154, 157, 159, 161, 240, 162, 239, 429/170, 237, 172, 180
See application file for complete search history.

(56) References Cited

U.S. PATENT DOCUMENTS

| | | | |
|---|---|---|---|
| 5,002,842 A | 3/1991 | Puglisi et al. | |
| 5,075,957 A | 12/1991 | Allen et al. | |
| 6,270,917 B1 | 8/2001 | Maeda et al. | |
| 6,365,297 B1 | 4/2002 | Wolczak et al. | |

FOREIGN PATENT DOCUMENTS

| | | | |
|---|---|---|---|
| JP | 2000-030670 A | | 1/2000 |
| JP | 2002-246007 A | | 8/2002 |
| JP | 2004-095402 A | * | 3/2004 |
| KR | 20-0355114 | | 7/2004 |
| KR | 0355114 | | 7/2004 |

* cited by examiner

*Primary Examiner*—Patrick Ryan
*Assistant Examiner*—Ben Lewis
(74) *Attorney, Agent, or Firm*—Lerner, David, Littenberg, Krumholz & Mentlik, LLP

(57) ABSTRACT

Disclosed herein are a stacking type electrode assembly constructed in a cathode/separator/anode structure, wherein the electrode assembly is provided at a predetermined region thereof with at least one through-hole, and a pair of holding members (a male coupling member and a female coupling member) constructed in a male-female coupling type structure is inserted through the through-hole inside a battery case, an outer surface of the female coupling member being brought into tight contact with the through-hole when the male coupling member is inserted into the female coupling member while the female coupling member having an outer diameter less than an inner diameter of the through-hole is inserted through the through-hole, and a secondary battery including the same. The electrode assembly according to the present invention has the effect of restraining the cathodes and the anodes from being moved separately from the separators, when an external force is applied to the electrode assembly, thereby preventing the occurrence of internal short circuits, and eventually, improving the safety of a secondary battery including the electrode assembly. Furthermore, the electrode assembly according to the present invention has the effect of restraining the movement of the electrodes due to repetitive contraction and expansion of the electrode assembly during the charge and discharge of the secondary battery.

14 Claims, 3 Drawing Sheets

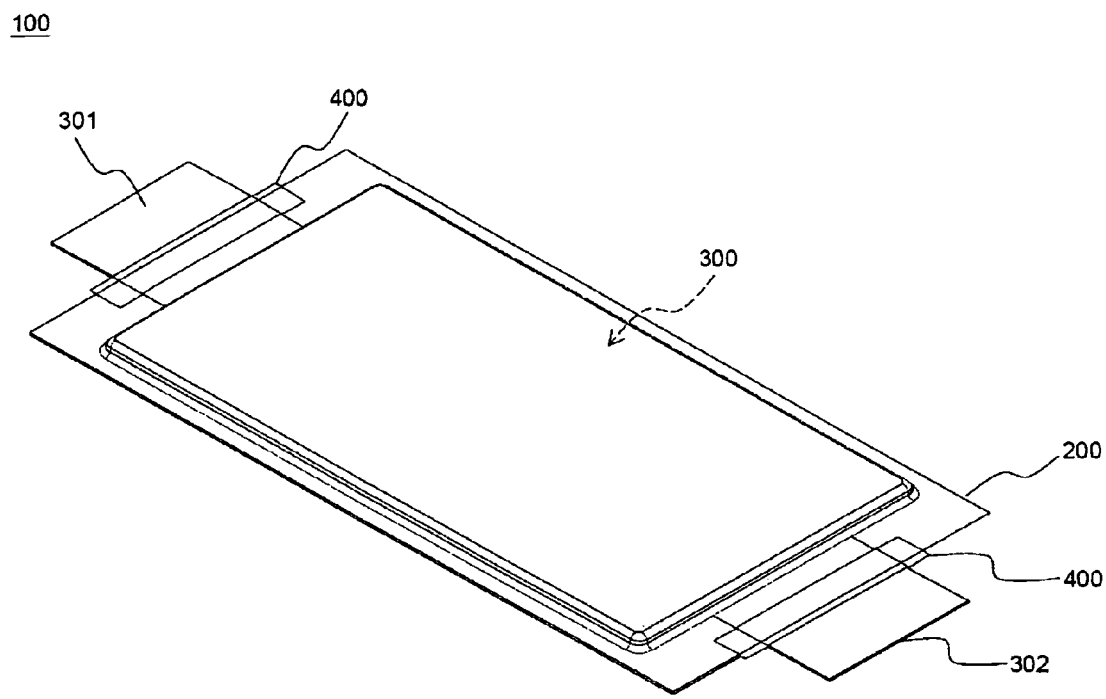
[Fig. 1]
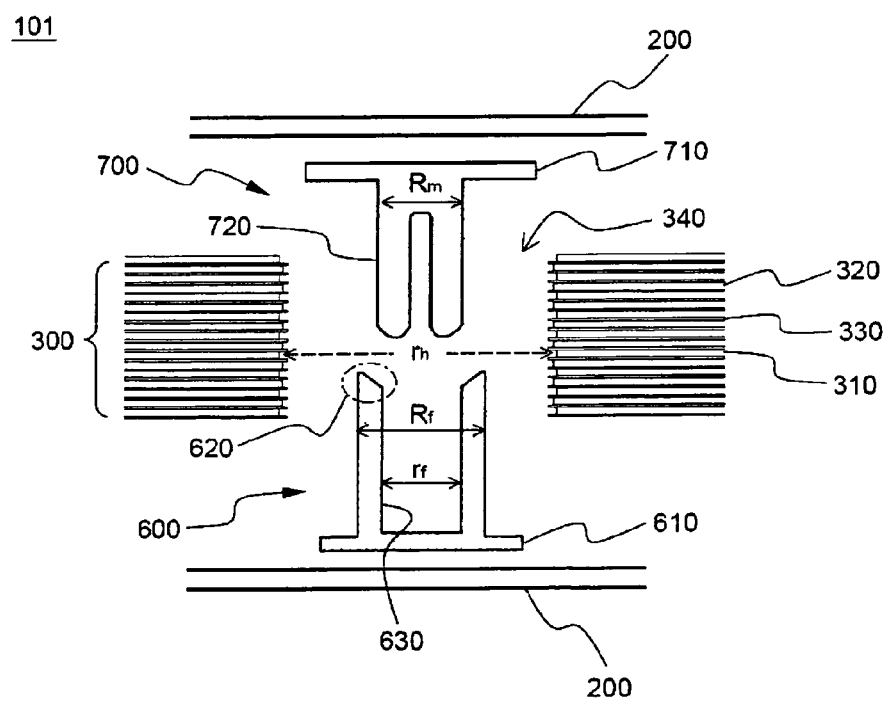
[Fig. 2]

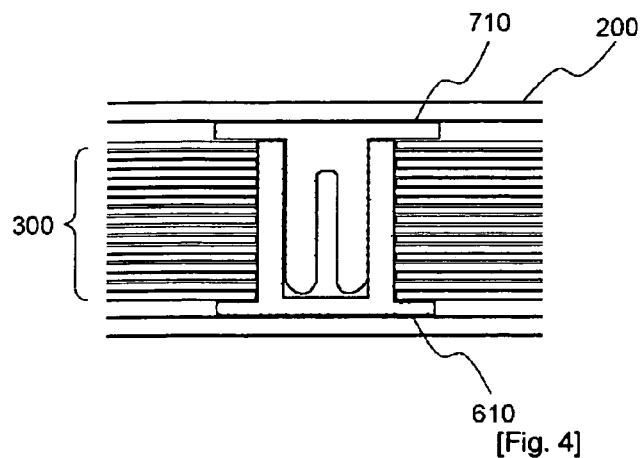
[Fig. 3]
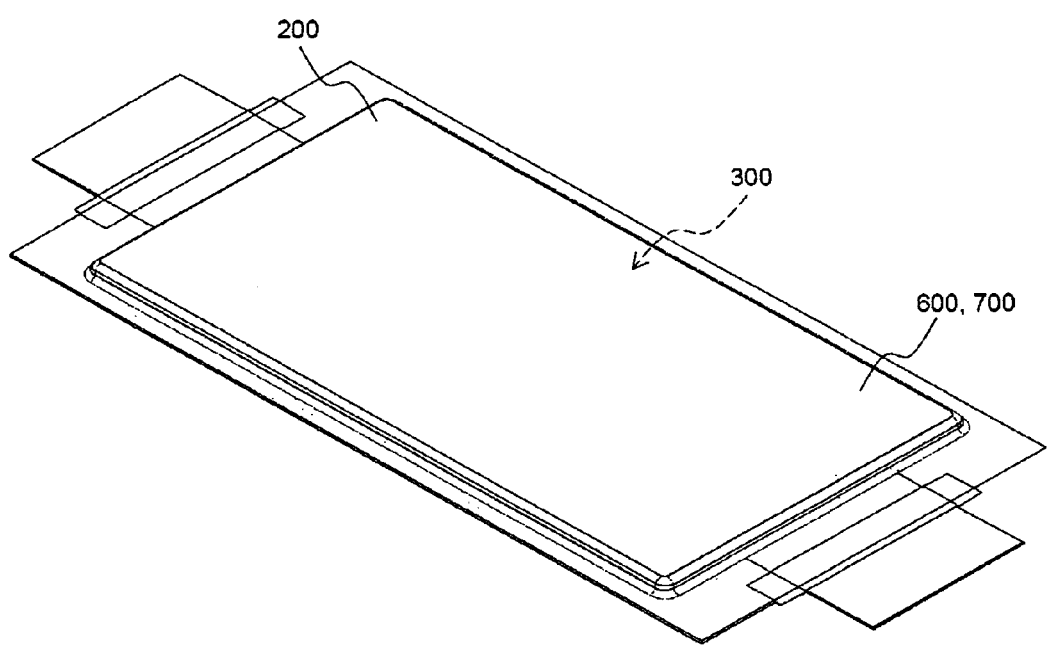
[Fig. 4]

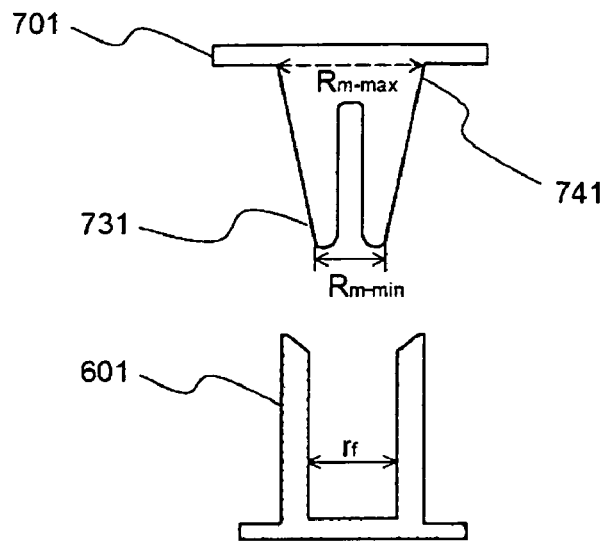
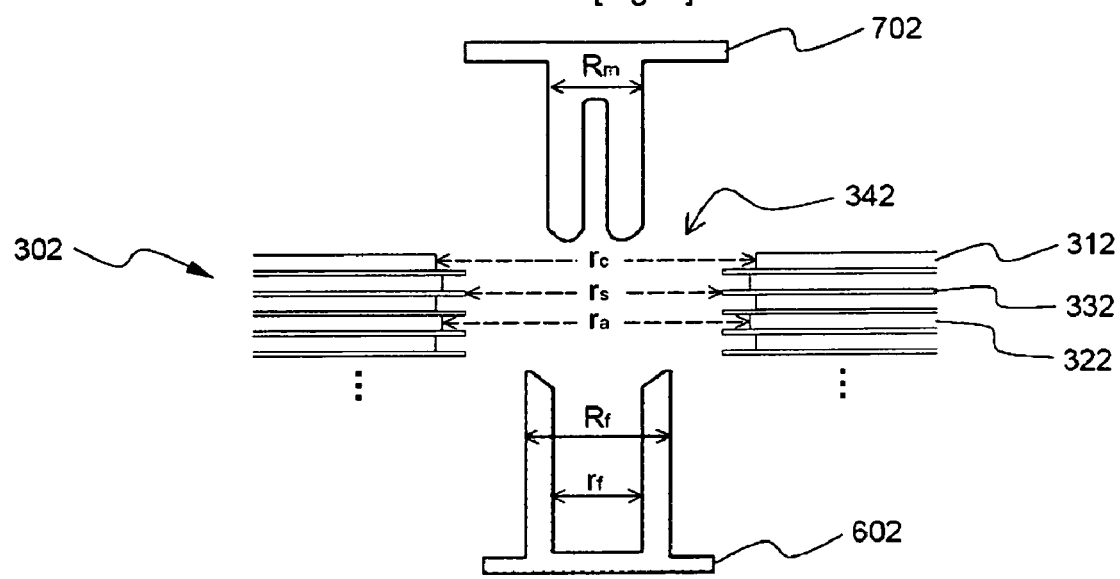

ELECTRODE ASSEMBLY HAVING MEMBER FOR HOLDING ELECTRODES AND SECONDARY BATTERY COMPRISING THE SAME

TECHNICAL FIELD

The present invention relates to an electrode assembly having electrode holding members, and, more particularly, to a stacking type electrode assembly constructed in a cathode/separator/anode structure, wherein the electrode assembly is provided at a predetermined region thereof with at least one through-hole, and a pair of holding members constructed in a male-female coupling type structure is inserted through the through-hole inside a battery case, thereby preventing the movement of the cathodes and the anodes, and a secondary battery including the same.

BACKGROUND ART

As mobile devices have been increasingly developed, and the demand of such mobile devices has increased, the demand of batteries has also sharply increased as an energy source for the mobile devices. As a result, much research on batteries satisfying various needs has been carried out.

In terms of the shape of the batteries, the demand of prismatic secondary batteries or pouch-shaped secondary batteries, which are thin enough to be applied to products, such as mobile phones, is very high. In terms of the material for the batteries, the demand of lithium secondary batteries, such as lithium ion batteries and lithium ion polymer batteries, having high energy density, high discharge voltage, and high output stability, is very high.

One of problems to be principally solved in connection with the secondary batteries is to improve the safety of the secondary batteries. For example, the lithium secondary batteries may explode due to the increase of temperature and pressure in the batteries, which may be caused by abnormal operations of the batteries, such as internal short circuits, overcharge exceeding allowed current and voltage, exposure to high temperature, or deformation due to falling or external impacts.

Among secondary batteries is a secondary battery including a stacking type electrode assembly in which the structural strength of the stacking type electrode assembly is low, and therefore, the secondary battery has high possibility that internal short circuits will occur due to falling or external impacts.

FIG. 1 is an exploded perspective view illustrating the structure of a pouch-shaped secondary battery including a general stacking type electrode assembly.

Referring to FIG. 1, a pouch-shaped secondary battery 100 is constructed in a structure in which an electrode assembly 300 including cathodes and anodes arranged such that cathode taps and anode taps protrude while being opposite to each other and separators disposed respectively between the cathodes and the anodes is mounted in a battery case such that two electrode leads 301 and 302 electrically connected to the cathode taps and the anode taps, respectively, are exposed to the outside.

The battery case 200 is made of a soft wrapping material, such as an aluminum laminate sheet. The battery case 200 includes a lower case having a hollow receiving part for receiving the electrode assembly 300 and an upper case. The battery case 200 may be formed using a mold constructed in a shape corresponding to the electrode assembly 300.

The cathode taps and the anode taps of the stacking type electrode assembly 300 are coupled to the electrode leads 301 and 302 by welding. To the upper and lower surfaces of the electrode leads 301 and 302 are attached insulation film 400 for securing the electrical insulation and sealability between the battery case 200 and the electrode leads 301 and 302.

However, the pouch-shaped secondary battery 100 has a problem in that the battery case 200 is made of a soft wrapping material having low strength, and therefore, the battery case is easily deformed when the secondary battery falls or external impacts are applied to the secondary battery. Furthermore, in the stacking electrode assembly 300, internal short circuits may occur due to the movement of electrodes about the separators due to the falling or the external impacts. Especially, the falling or vibration of the secondary battery frequently occurs during the use of the secondary battery. Consequently, there is high necessity of a technology for more efficiently securing the safety of the secondary battery.

In order to solve the above-mentioned problems, Korean Utility Model Registration No. 0355114 discloses a technology for mounting an electrode plate group (electrode assembly) including cathodes, anodes, and separators in a battery case and inserting insulative holding pins through through-holes formed in the electrode assembly and the battery case so as to restrain the movement of cathodes and anodes. However, this technology essentially requires that the battery case be stiff because the holding pins are inserted through the through-holes of the battery case. Also, an electrolyte may leak from the battery case through the through-holes of the battery case. Furthermore, when the holding pins are inserted through the through-holes of the electrode assembly, the cathodes and the anodes may be brought into contact with each other in the through-holes, and therefore, internal short circuits may occur.

In addition, Japanese Patent Application Publication No. 2000-030670 discloses a secondary battery in which a through-hole is formed in the middle of an electrode assembly, and an insulative connecting member to be inserted though the through-hole is formed at a plate member which is mounted to one major surface of the electrode assembly. However, this technology requires the plate member as an additional mounting member. Furthermore, when the insulative connecting member is inserted through the through-hole, internal short circuits may occur.

Even though having a somewhat different object, Japanese Patent Application Publication No. 2002-246007 discloses a technology for mounting current collecting terminals for electrical connection to one-side ends of cathodes and anodes of an electrode assembly, drilling holes in the electrodes, inserting conductive pins through the holes such that the conductive pins are connected to the current collecting terminals, which is distinguished from a conventional technology for accomplishing electrical connection using electrode taps. However, this technology has problems in that the manufacturing process is very complicated, the total size of the secondary battery is inevitably increased, and the change in volume of the secondary battery during the charge and discharge of the secondary battery is not restrained, although the secondary battery is constructed in a structure in which the through-holes are formed in a part of the electrode assembly and the additional members are inserted through the through-holes.

DISCLOSURE OF INVENTION

Technical Problem

Therefore, the present invention has been made to solve the above-mentioned problems, and other technical problems that have yet to be resolved.

Specifically, it is an object of the present invention to provide an electrode assembly that is capable of restraining cathodes and anodes of the electrode assembly from being moved separately from separators, when an external force is applied to the electrode assembly, thereby preventing the occurrence of internal short circuits, and eventually, improving the safety of a secondary battery including the electrode assembly.

It is another object of the present invention to provide an electrode assembly that is capable of restraining the movement of electrodes due to repetitive contraction and expansion of the electrode assembly during the charge and discharge of the secondary battery.

It is yet another object of the present invention to provide a secondary battery including the electrode assembly.

Technical Solution

In accordance with one aspect of the present invention, the above and other objects can be accomplished by the provision of a stacking type electrode assembly constructed in a cathode/separator/anode structure, wherein the electrode assembly is provided at a predetermined region thereof with at least one through-hole, and a pair of holding members (a male coupling member and a female coupling member) constructed in a male-female coupling type structure is inserted through the through-hole inside a battery case, an outer surface of the female coupling member being brought into tight contact with the through-hole when the male coupling member is inserted into the female coupling member while the female coupling member having an outer diameter less than an inner diameter of the through-hole is inserted through the through-hole.

Generally, internal short circuits inside a battery due to an external force applied to the battery may serve as a principal factor that causes the battery to explode or catch fire. This is because, when impacts or vibrations are applied to the battery, electrodes are moved in the electrode assembly with the result that high resistance heat is generated due to conducting current in the contact resistance parts between a cathode active material and an anode active material. When the interior temperature of the battery exceeds a critical temperature level due to the high resistance heat, the oxide structure of the cathode active material is collapsed, and therefore, a thermal runaway phenomenon occurs. As a result, the battery may catch fire or explode.

According to the present invention, on the other hand, the electrode assembly is mounted in the battery case while the electrodes of the electrode assembly are stably located in position by the holding members. Consequently, even when an external force is applied to the battery, the movement of the electrodes in the electrode assembly is restrained, and therefore, the occurrence of internal short circuits is prevented, and, ultimately, the safety of the battery is improved.

In the present invention, the "predetermined region" of the electrode assembly means an arbitrary region selected from two major surfaces of the electrode assembly constructed in a structure in which pluralities of cathodes, separators, and anodes are stacked in regular sequence. For example, the predetermined region of the electrode assembly may be the middle part or opposite side parts of the two major surfaces of the electrode assembly. However, the predetermined region of the electrode assembly is not particularly restricted so long as the movement of the electrodes is effectively restrained.

For the sake of convenience, the holding members constructed in the male-female coupling type structure will be also referred to hereinafter as male and female coupling members, or, simply, holding members.

According to the present invention, the male and female coupling members may be constructed in various structures depending upon the inner structure of the through-hole. Preferably, the male and female coupling members are constructed in a flange structure in which ends of the male and female coupling members contacting the battery case have a size greater than that of the through-hole. Consequently, the male and female coupling members constructed in the flange structure partially covers the outer surface of the electrode assembly, and therefore, the electrodes and the separators are brought into tighter contact with each other in the stacking direction of the electrodes and the separators. As a result, it is possible to restrain the individual movement of the electrodes due to the separation of the electrodes from the separators caused by the contraction and expansion of the electrode assembly during the charge and discharge of the battery.

Preferably, the flange end of the male coupling member and/or the female coupling member is attached to the inside surface of the battery case. Consequently, the electrode assembly is prevented from moving in the battery case, and therefore, the safety of the battery is further improved when an external force is applied to the battery. The attachment of the flange end to the inside surface of the battery case may be accomplished in various manners. For example, the flange end may be attached to the inside surface of the battery case by adhesion or by thermal welding.

Generally, it is required to the outer surface of the holding members to be brought into tight contact with the inner surface of the through-hole while the holding members are inserted through the through-hole of the electrode assembly such that it is possible to prevent the movement of the electrodes of the electrode assembly when an external force is applied to the battery. Consequently, in order to securely insert the one-unit holding member through the through-hole of the electrode assembly as in the conventional art previously described, it is required for the holding member to have an outer diameter approximately equal to an inner diameter of the through-hole. When the holding member is inserted through the through-hole of the electrode assembly, however, the ends of the electrodes in the through-hole may be deformed and brought into contact with each other with the result that short circuits may occur at the time of current conduction after the assembly of the battery is completed.

According to the present invention, on the other hand, when the male coupling member is inserted into the female coupling member while the female coupling member having the outer diameter less than the inner diameter of the through-hole is inserted through the through-hole as described above, the outer surface of the female coupling member is brought into tight contact with the through-hole, whereby the holding member is mounted to the electrode assembly, and therefore, the above-mentioned problems are solved.

Specifically, the through-hole having the inner diameter greater than the outer diameter of the female coupling member is formed in the electrode assembly, the female coupling member is inserted through the through-hole of the electrode assembly, and the male coupling member having the diameter greater than that of the female coupling member is inserted into the female coupling member such that the diameter of the female coupling member is increase, whereby the female coupling member is brought into tight contact with the inner surface of the through-hole, and therefore, the problems caused by the conventional art do not occur.

The male coupling member is not particularly restricted so long as the male coupling member is constructed in a structure to increase the outer diameter of the female coupling member when the male coupling member is inserted into the female coupling member. For example, the male coupling member may have an outer diameter greater than an inner diameter of the female coupling member. Alternatively, the male coupling member may be constructed in a structure in which the outer diameter of the male coupling member is gradually increased from one end distant from the flange to the other end connected to the flange. In the latter case, the male coupling member may have a maximum outer diameter greater than the inner diameter of the female coupling member and a minimum outer diameter less than the inner diameter of the female coupling member, whereby the coupling between the male and female coupling members is easily accomplished.

The female coupling member is constructed in a hollow structure corresponding to the outer surface of the male coupling member such that the male coupling member can be inserted into the female coupling member. Preferably, the female coupling member is constructed such that an inside end of the female coupling member is downward tapered at the side thereof where the male coupling member is inserted into the female coupling member such that the male coupling member can be inserted into the female coupling member.

In another preferred embodiment, the through-hole of the electrode assembly is constructed such that a through-hole part formed in the separators has an inner diameter less than inner diameters of through-hole parts formed in the cathodes and the anodes. In this case, the separators, which relatively protrude in the through-hole, are bent by the female coupling member inserted through the through-hole, and the ends of the cathodes and the anodes are covered by the bent separators. As a result, the contact between the cathodes and the anodes is prevented.

Here, the inner diameters of the through-hole parts of the cathodes and the anodes have no relation to the contact between the cathodes and the anodes. Consequently, the inner diameters of the through-hole parts of the cathodes and the anodes are not particularly restricted so long as the inner diameters of the through-hole parts of the cathodes and the anodes are greater than the inner diameter of the through-hole part of the separators. Preferably, the inner diameter of the through-hole part of the anodes is less than the inner diameter of the through-hole part of the cathodes so as to minimize the resin-shaped growth (dendrite) of lithium metal on the surfaces of the anodes.

Preferably, the outer diameter of the female coupling member is greater than the inner diameter of the through-hole part of the separators and less than the inner diameters of the through-hole parts of the cathodes and the anodes such that only the separators protruding inward in the through-hole are bent when the female coupling member is inserted through the through-hole.

According to the present invention, the male and female coupling members may be coupled with each other in various manners. For example, the male and female coupling members may be coupled with each other by forcible fitting or by threaded engagement of male and female screws formed at interfaces of the male and female coupling members.

In the present invention, the inner and outer diameters of the male and female coupling members are expressions used to illustrate the insertion of the male coupling member into the female coupling member in the course of the coupling between the male and female coupling members. For example, since the outer surface of the male coupling member is brought into contact with the inner surface of the female coupling member, the sizes of the male and female coupling members are compared with each other using the inner diameter of the female coupling member and the outer diameter of the male coupling member. When the absolute sizes of the male and female coupling members are compared with each other, the diameters of the male and female coupling members are used instead of the inner diameter of the female coupling member and the outer diameter of the male coupling member.

The male and female coupling members are not particularly restricted so long as the male and female coupling members are made of insulative material and are maintained in a specific shape while affecting components of the battery. Preferably, the male and female coupling members are made of resin, such as polypropylene or Teflon.

In accordance with another aspect of the present invention, there is provided a secondary battery including the electrode assembly with the above-described construction. Preferably, the battery is a pouch-shaped secondary battery having an electrode assembly mounted in a battery case made of a laminate sheet including a metal layer and a resin layer.

Preferably, the battery is used as a unit cell included in a high-output, large-capacity battery pack. The high-output, large-capacity battery pack may be used as a power source for vehicles. In this case, it is possible to provide high safety due to the structural characteristics of the electrode assembly as described above even when the high-output, large-capacity battery pack is frequently vibrated or external impacts are applied to the high-output, large-capacity battery pack.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an exploded perspective view illustrating a pouch-shaped secondary battery including a general stacking type electrode assembly;

FIG. 2 is an exploded sectional view, in part, illustrating a secondary battery to which electrode holding members constructed in a male-female coupling type structure according to a preferred embodiment of the present invention are mounted;

FIG. 3 is an assembled sectional view, in part, of FIG. 2;

FIG. 4 is a see-through view, in part, illustrating a secondary battery according to a preferred embodiment of the present invention to which the holding members shown in FIG. 3 are mounted;

FIG. 5 is a sectional view illustrating another example of electrode holding members applicable to the coupling structure shown in FIG. 2; and FIG. 6 is a sectional view illustrating an electrode assembly to which electrode holding members constructed in a coupling structure according to another preferred embodiment of the present invention are mounted.

MODE FOR THE INVENTION

Now, preferred embodiments of the present invention will be described in detail with reference to the accompanying drawings. It should be noted, however, that the scope of the present invention is not limited by the illustrated embodiments.

FIG. 2 is an exploded sectional view, in part, illustrating a secondary battery to which electrode holding members constructed in a male-female coupling type structure according to a preferred embodiment of the present invention are mounted, and FIG. 3 is an assembled sectional view, in part, of FIG. 2.

Referring first to FIG. 2, a secondary battery 101 is constructed in a structure in which a stacking type electrode assembly 300 including cathodes 310, anodes 320, and separators 330 is mounted in a battery case 200 made of a laminate sheet. The electrode assembly 300 is held by inserting a pair of holding members (female and male coupling members) 600 and 700 constructed in a male-female coupling type structure through a through-hole 340 formed in the electrode assembly 300. For easy description, the through-hole 340 is exaggeratingly shown in the drawing as compared to the holding members 600 and 700.

The female and male coupling members 600 and 700 have flanges 610 and 710, which have a size greater than that of the through-hole 340 at the sides thereof contacting the battery case 200. As shown in FIG. 3, which is a sectional view, in part, of the assembled secondary battery, the flanges 610 and 710 are attached to the inside surface of the battery case 200, whereby the electrode assembly 300 is brought into tighter contact with the battery case 200.

Referring back to FIG. 2, the female coupling member 600 has an outer diameter $R_f$ less than an inner diameter $r_h$ of the through-hole 340 in order to prevent ends of the cathodes 310 and ends of the anodes 320 of the electrode assembly 300 from being brought into contact with each other when the holding members 600 and 700 are inserted through the electrode assembly 300. As a result, the female coupling member 600 is inserted into the through-hole 340 while the female coupling member 600 is spaced apart from the inner surface of the through-hole 340. Also, the male coupling member 700 has an outer diameter $R_m$ greater than an inner diameter $r_f$ of the female coupling member 600. Consequently, when the male coupling member 700 is inserted into the female coupling member 600, the female coupling member 600 is brought into contact with the inner surface of the through-hole 340 by the male coupling member 700.

The inside end of the female coupling member 600 is constructed in a downward taper structure 620, by which the relatively large male coupling member 700 is easily inserted into the female coupling member 600.

The coupling between the male coupling member 700 and the female coupling member 600 may be accomplished in various manners. For example, the female coupling member 600 may be provided at an inside surface 630 thereof with a thread part, the male coupling member 700 may be provided at an outside surface 720 thereof with a thread part, and the thread part of the male coupling member 700 is threadedly engaged with the thread part of the female coupling member 600, whereby the coupling between the male coupling member 700 and the female coupling member 600 is accomplished.

FIG. 4 is a see-through view, in part, illustrating a secondary battery according to a preferred embodiment of the present invention to which the holding members with the above-stated construction are mounted.

Referring to FIG. 4, a secondary battery 101 is provided at regions adjacent to upper and lower end corners of an electrode assembly 300 mounted in a battery case 200 with four pairs of holding members 600 and 700, which are disposed in a symmetrical structure. However, the disposition of the holding members 600 and 700 is not particularly restricted.

The holding members 600 and 700 are included in the battery case 200, and therefore, there is no possibility that an electrolyte leaks due to the provision of the holding members 600 and 700.

FIG. 5 is a sectional view illustrating another example of electrode holding members applicable to the coupling structure shown in FIG. 2.

Referring to FIG. 5, a male coupling member 701, which is inserted into a female coupling member 601 having approximately the same shape as the female coupling member shown in FIG. 2, is constructed in a structure in which the outer diameter of the male coupling member 701 is gradually increased from an end 731 distant from the flange 710 to an end 741 connected to the flange 710. Also, the male coupling member 701 is constructed such that the male coupling member 701 has a maximum outer diameter $R_{m-max}$ greater than an inner diameter $r_f$ of the female coupling member 601, and the male coupling member 701 has a minimum outer diameter $R_{m-min}$ less than the inner diameter $r_f$ of the female coupling member 601. Consequently, when the male coupling member 701 is inserted into the female coupling member 601, the female coupling member 601 is brought into contact with the inner surface of a through-hole by the male coupling member 701 in the same manner as in FIG. 2.

FIG. 6 is a sectional view illustrating an electrode assembly to which electrode holding members constructed in a coupling structure according to another preferred embodiment of the present invention are mounted.

Referring to FIG. 6, an electrode assembly 302 is constructed in a structure in which cathodes 312, anodes 322, and separators 332 are stacked such that a through-hole part formed in the separators 332 has an inner diameter $r_s$ less than inner diameters $r_c$ and $r_a$ of through-hole parts formed in the cathodes and the anodes in order to prevent the cathodes 312 and the anodes 322 from being brought into contact with each other when female and male coupling members 602 and 702 are inserted through the electrode assembly 302. Consequently, when the female and male coupling members 602 and 702 are inserted through a through-hole 342 of the electrode assembly 302, the separators 332, which relatively protrude, are bent, and therefore, cover the inside ends of the cathodes 312 and the anodes 322. As a result, the contact between the cathodes 312 and the anodes 322 is prevented.

Also, the electrode assembly 302 is constructed such that the inner diameter $r_c$ of the through-hole part of the cathodes is greater than the inner diameter $r_a$ of the through-hole part of the anodes. This is because the resin-shaped growth (dendrite) of lithium metal on the surfaces of the anodes 322 is minimized, when the size of the anodes 322 is greater than that of the cathodes 312, irrespective of inner short circuits.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrode assembly according to the present invention has the effect of restraining the cathodes and the anodes from being moved separately from the separators, when an external force is applied to the electrode assembly, thereby preventing the occurrence of internal short circuits, and eventually, improving the safety of a secondary battery including the electrode assembly. Furthermore, the electrode assembly according to the present invention has the effect of restraining the movement of the electrodes due to repetitive contraction and expansion of the electrode assembly during the charge and discharge of the secondary battery.

The invention claimed is:

1. A stacking type electrode assembly constructed in a cathode/separator/anode structure, wherein the electrode assembly comprises, at a predetermined region thereof, at least one through-hole, and a pair of holding members constructed in a male-female coupling type structure, wherein the pair of holding members is a male coupling member and a female coupling member, and is inserted through the through-hole inside a battery case, an outer surface of the female coupling member being brought into tight contact with the through-hole when the male coupling member is inserted into the female coupling member while the female coupling member having an outer diameter less than an inner diameter of the through-hole when the female coupling member is inserted through the through-hole, wherein the through-hole of the electrode assembly is constructed such that a through-hole part formed in separators has an inner diameter less than inner diameters of through-hole parts formed in cathodes and anodes.

2. The electrode assembly according to claim 1, wherein the male and female coupling members are constructed in a flange structure in which ends of the male and female coupling members contacting the battery case have a size greater than that of the through-hole.

3. The electrode assembly according to claim 2, wherein the flange end of the male coupling member and/or the female coupling member is attached to the inside surface of the battery case.

4. The electrode assembly according to claim 1, wherein the male coupling member has an outer diameter greater than an inner diameter of the female coupling member.

5. The electrode assembly according to claim 1, wherein the male coupling member is constructed in a structure in which an outer diameter of the male coupling member is gradually increased from one end distant from a flange to the other end connected to the flange.

6. The electrode assembly according to claim 5, wherein the male coupling member has a maximum outer diameter greater than an inner diameter of the female coupling member and a minimum outer diameter less than the inner diameter of the female coupling member.

7. The electrode assembly according to claim 1, wherein the female coupling member is constructed such that an inside end of the female coupling member is downward tapered at the side thereof where the male coupling member is inserted into the female coupling member.

8. The electrode assembly according to claim 1, wherein the inner diameter of the through-hole part of the anodes is less than the inner diameter of the through-hole part of the cathodes.

9. The electrode assembly according to claim 1, wherein the outer diameter of the female coupling member is greater than an inner diameter of a through-hole part formed in the separators and less than inner diameters of through-hole parts formed in the cathodes and the anodes.

10. The electrode assembly according to claim 1, wherein the male and female coupling members are coupled with each other by forcible fitting or by threaded engagement of male and female screws formed at interfaces of the male and female coupling members.

11. The electrode assembly according to claim 1, wherein the holding members are made of plastic resin.

12. A secondary battery comprising the electrode assembly according to any one of claims 1 to 7 and 8 to 11.

13. The secondary battery according to claim 12, wherein the battery is a pouch-shaped secondary battery having an electrode assembly mounted in a battery case made of a laminate sheet comprising a metal layer and a resin layer.

14. The secondary battery according to claim 12, wherein the battery is used as a unit cell included in a high-output, large-capacity battery pack for vehicles.

* * * * *